United States Patent [19]

Richards et al.

[11] 4,091,265
[45] May 23, 1978

[54] FUEL FILTER HEATING ASSEMBLY

[75] Inventors: Mark S. Richards; Robert Zeff, both of Modesto, Calif.

[73] Assignee: Racor Industries, Inc., Modesto, Calif.

[21] Appl. No.: 602,215

[22] Filed: Aug. 6, 1975

[51] Int. Cl.² .................. H05B 1/02; F24H 1/10; B01D 35/18; F02M 31/12

[52] U.S. Cl. .................. 219/501; 123/122 E; 165/134; 210/184; 210/440; 219/201; 219/202; 219/306; 219/308; 219/331; 219/381; 219/505

[58] Field of Search .................. 219/296–299, 219/301, 302, 306, 307, 381, 382, 200, 201, 202, 205–207, 504, 501, 505, 210, 308, 309, 331, 328; 165/134; 210/184–186, 149, 440; 123/122 E, 122 F

[56] References Cited

U.S. PATENT DOCUMENTS

| 564,657 | 7/1896 | Stiebel | 210/184 |
|---|---|---|---|
| 1,806,701 | 5/1931 | Moreton | 210/184 |
| 2,103,434 | 12/1937 | Pennebaker | 210/185 |
| 2,302,489 | 11/1942 | Brown | 210/184 X |
| 2,429,321 | 10/1947 | LaBrecque | 210/186 |
| 3,243,572 | 3/1966 | Vogt et al. | 219/210 |
| 3,320,407 | 5/1967 | Holmes | 219/501 |
| 3,333,086 | 7/1967 | Williams | 219/501 |
| 3,393,870 | 7/1968 | Jeffrey | 219/501 X |
| 3,413,438 | 11/1968 | Gardner et al. | 219/210 |
| 3,517,162 | 6/1970 | Webb | 219/501 X |

FOREIGN PATENT DOCUMENTS

| 2,150,585 | 5/1972 | Germany | 219/241 |
|---|---|---|---|
| 2,255,736 | 5/1974 | Germany | 219/301 |

Primary Examiner—A. Bartis
Attorney, Agent, or Firm—Phillips, Moore, Weissenberger, Lempio & Majestic

[57] ABSTRACT

A solid state fuel heater unit for use in heating the fuel flow in a fuel filter is disclosed which unit includes a heat conducting ring having a power transistor mounted thereon and driving a power resistor mounted therewithin. Circuitry for controlling the operation of the power transistor, including a thermistor, is mounted within the ring by means of component sealant or potting material which isolates the thermistor from direct transfer of heat thereto from the power transistor and power resistor. The heater unit is adapted to be immersed in the flow of fuel in a fuel filter with the axis of the ring substantially parallel to the fuel flow through the filter.

5 Claims, 5 Drawing Figures

FUEL FILTER HEATING ASSEMBLY

It has long been recognized that hydrocarbon fluids, particularly those used in the operation of diesel engines, must be maintained at a temperature high enough so as to avoid fuel flow difficulties. If the temperature of the fuel is too low (below the pour point) the fuel will not flow due to the increased viscosity of the fuel. For example, number two diesel fuel will not flow below approximately −15° F, a temperature frequently reached in many parts of the Continental United States and particularly in Alaska. Number one diesel fuel will not flow below −35° F.

Additionally, even though the diesel fuel itself may flow at temperatures above its "pour point" certain other disadvantages result when operating at such temperatures. Ice crystals and wax form in the diesel fuel at such low temperatures, causing the filter to be coated or otherwise encased, interferring with the operation of the fuel filter, which serves to remove impurities from the diesel fuel. Failure to remove the impurities may result in damage to the engine or the clogging of the fuel lines.

One approach to avoiding the above problems is to use additives to lower the viscosity of the fuel and therefore lower the temperature at which the fuel will flow freely. Common additives are alcohol and gasoline. The addition of additives, however, has not proven to be a practical method of avoiding the problems of fuel flow at low temperatures. The additives do not contain a lubricating agent which is essential for the operation of engines. As a result, the use of fuels with an additive results in the rapid wear of ejectors and pumps, and other parts of the engine.

The concept that the fuel be heated in some manner has long been recognized and various attempts to provide heating units, of one kind or another, for avoiding the icing, waxing or failure of the fuel to flow have been proposed in the past. One such method has been to use the exhaust of the manifold for heating the fuel and preventing its icing and waxing at low temperatures. However, the use of the manifold exhaust is only available after the engine has been warmed up, and is not useful for actually starting the engine when the fuel may not be viscous.

In the patent to Kasten, U.S. Pat. No. 2,635,174, issued Apr. 14, 1953, an electrical method of heating fuel is disclosed. In Kasten a high resistance wire is incorporated into the filter element itself. Heat is generated in the high resistance wire by having current flow directly through the wire depending upon whether or not a contact was closed. The position of the contact, either open or closed, was determined by the position of a metallic diaphragm which serves as a thermostat. The diaphragm is in a first position at one predetermined temperature and at a second position at a lower temperature. When at the second position the diaphragm closed the circuit permitting current to flow through the high resistance wire, and heating the fuel.

The heating unit proposed by Kasten would be rather expensive to manufacture, requiring a fuel filter assembly to be specially constructed having a casing which would not be useful if heating was not desired. Additionally, the amount of heat generated by the heating unit was directly related to the resistance of the wire which was controlled by a rather unsophisticated and rather limited theremostat mechanism. The entire diaphragm thermostat would have to be changed in order to vary the desired temperature at which the fuel is desired to be maintained.

In the patent to King et al, U.S. Pat. No. 3,235,084, issued Feb. 15, 1966, a heating element was positioned within the center of a fuel filter element. The heating element in King is described as being conventional, compromising high resistance wire wrapped around a ceramic core. The high resistance wire is again activated by the direct application of current which is controlled by the action of a thermostat attached to the outer casing of the fuel filter assembly. As in the patent to Kasten, this heater is rather limited, requiring a specially adapted fuel filter assembly casing and a rather limited thermostat control device.

Solid state electrical heater control circuits have been devised such as the patent to Carlson, U.S. Pat. No. 2,975,260, issued Mar. 14, 1961, the Engleman Defensive Publication, Ser. No. 728,616, published Feb. 4, 1969, and patent to Peter Lauck III, U.S. Pat. No. 3,544,767, issued Dec. 1, 1970. In such circuits a heating element such as a resistance wire provides heat due to the current passing through such heating element. The environmental temperature is sensed by a thermistor having a negative temperature coefficient of resistance. In each of these circuits a thermistor is used for the purpose of controlling the current flowing through the heating element, but are not themselves used or intended to serve a heating function. Such solid state heating units are not known to have been employed in association with a fuel filter for heating fuel prior to its entering the filter system.

In the present invention a solid state heating unit controlled by a thermistor employs two silicon power transistors and two power resistors, for generating heat. The heating unit is supported on a base in a conventional fuel filter directly below the entry surface of the fuel filter. The heat generated by the power transistors and the power resistors is conducted to the mounting ring, thereby uniformly distributing the generated heat to the fuel prior to its entering the surface of the fuel filter. The thermistor is isolated from the power transistors and power resistors so as to be responsive to the temperature variations in the fuel proximate the mounting ring and not primarily responsive to the heat generated by the heating unit.

These and other features of the invention will be more fully realized after referring to the complete disclosure of the subject invention given in the following specification and drawings, which form a part hereof.

Referring to the drawings.

DETAILED DESCRIPTION OF DRAWINGS

Figure 1:
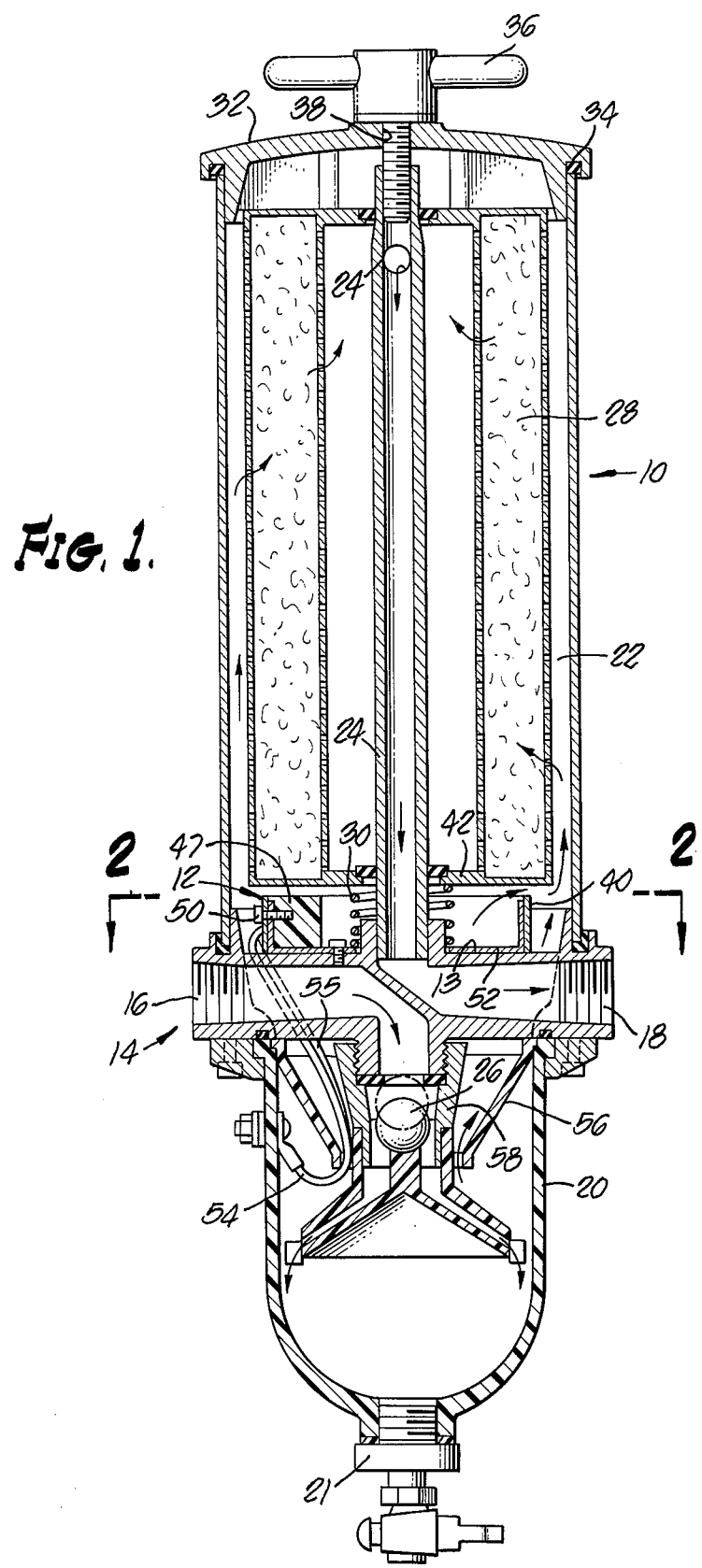
FIG. 1 is a sectional view of the fuel filter assembly of the present invention.

Referring to FIG. 1, a sectional side view of a fuel filter assembly 10 incorporating a thermostatically controlled heater unit 12, is shown. The filter assembly 10 comprises a base 13 having a fuel passageway 14 with an inlet 16 and an outlet 18; sediment bowl 20 having a drain assembly 21; a removably enclosed fuel filter chamber 22 having a return path means 24 to the outlet 18. The inlet 16 has a conventional inlet check valve 26 for preventing the return flow of fuel out of the inlet 16. The enclosed fuel filter chamber 22 has a removable cover 32 which retains a sealing gasket 34 against the upper rim of the chamber 22. The annular fuel filter 28 is supported upon fuel filter spring 30 surrounding return path tube 24. The cover 32 is maintained in place by a T-handle 36 which threadedly engages the internal threading within the end of return path tube 24 through an aperture 38 in cover 32.

Figure 2:
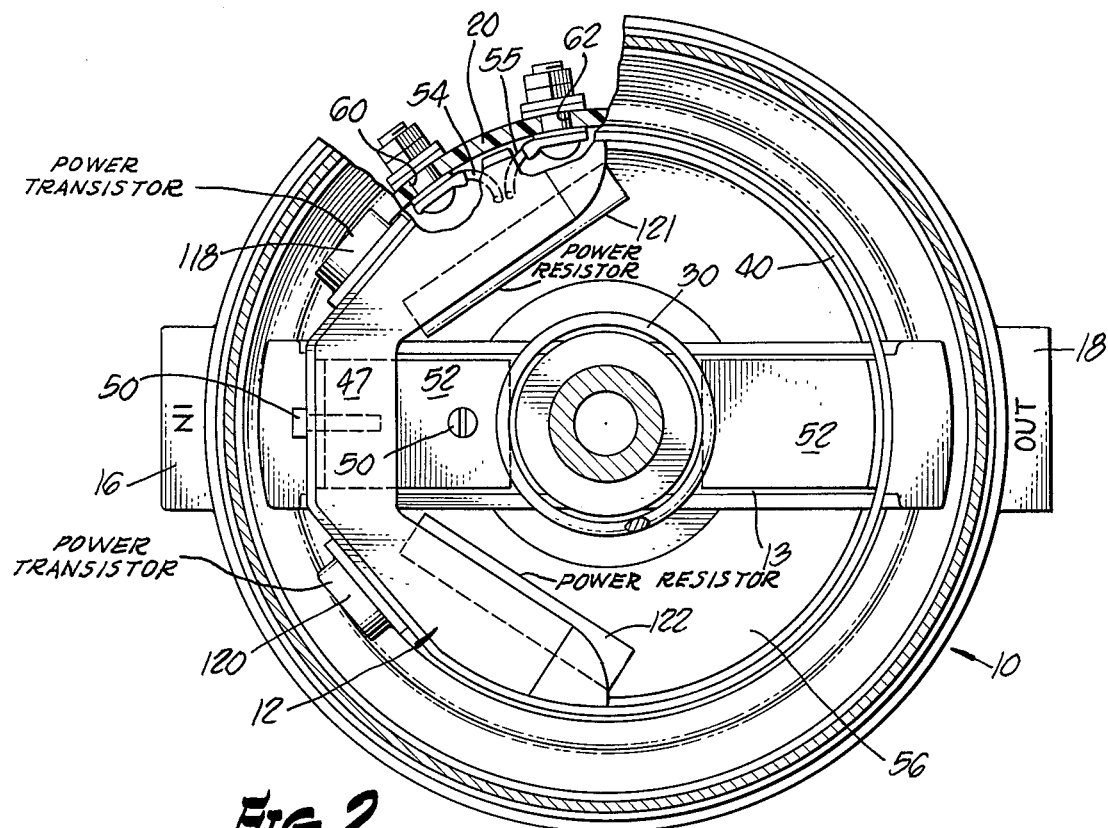
FIG. 2 is a plan view of the solid state heating unit taken along lines 2—2 of FIG. 1.
Figure 3:
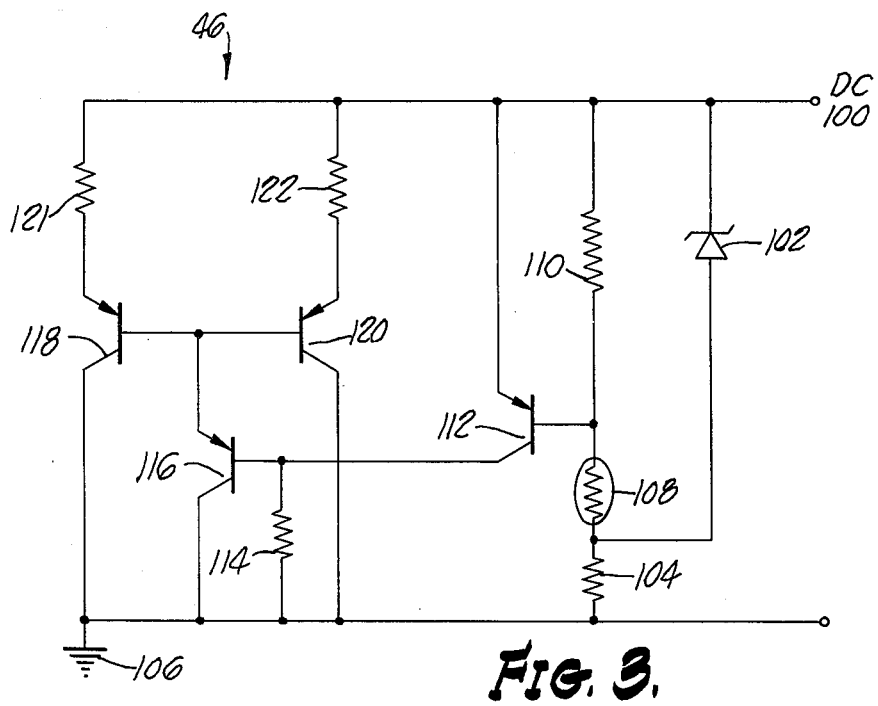
FIG. 3 is a circuit diagram of the solid state heating unit.
Figure 4:
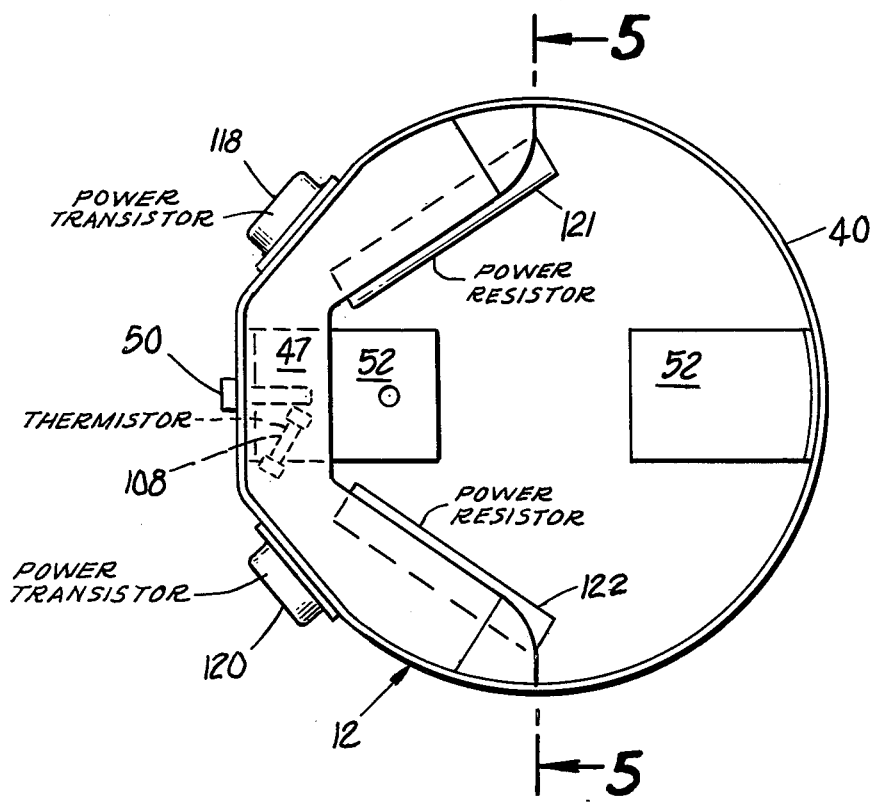
FIG. 4 is a plan view similar to FIG. 2 but showing only the solid state heating unit with the thermistor indicated in dotted lines.
Figure 5:
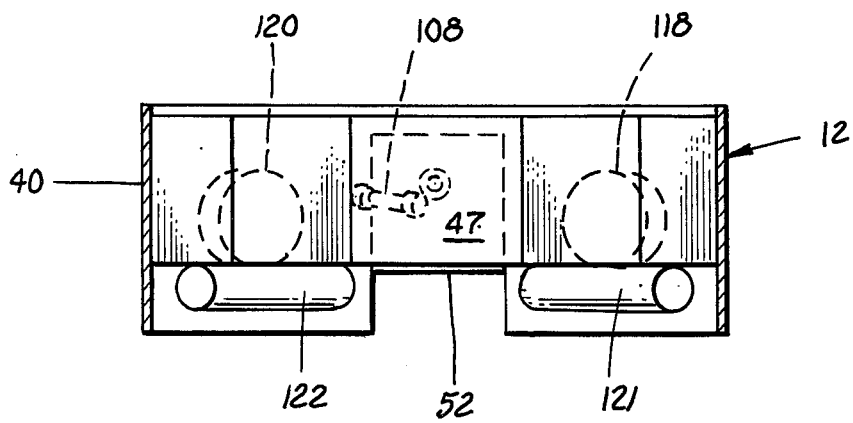
FIG. 5 is a cross-sectional view taken along line 5—5 of FIG. 4.

Referring to FIG. 2, the heater unit 12 comprises a heater mounting ring 40 having an annular configuration. The heater mounting ring 40 has two mounting platforms 52 extending radially opposite one another for supporting the mounting ring 40 upon the base 13. The solid state heating circuit 46, shown in greater detail in FIG. 3, is mounted with its power transistors on the outer periphery of the mounting ring 40, the power resistors within the mounting ring 40, and the remainder of the electrical components, including the thermistor, on the inner periphery of the mounting ring 40, covered by component sealant 47. The mounting ring 40 is held in place by a combination of epoxy and screws 50.

Electrical lead wires 54 and 55, shown in FIG. 1, connect the solid state heating unit 12 to the power supply consisting of a DC battery. The lead wires 54 and 55 pass between conical baffle 56 and the outside of the tube 58 containing the inlet check valve 26 and through apertures 60 and 62 in the sidewall of sediment bowl 20.

Referring to FIG. 3, the solid state circuit 46 comprising heating unit 12 is shown in detail. The cathode of zener diode 102 is connected to the positive terminal of power supply 100 with its anode connected through resistor 104 to ground 106 and to one side of thermistor 108. The other side of thermistor 108 is connected through resistor 110 to the power supply 100 and to the base of transistor 112. The emitter of transistor 112 is connected to power supply 100 while the collector of transistor 112 is connected through biasing resistor 114 to ground and to the base of transistor 116. Transistor 116 has its collector connected to ground and its emitter connected to the bases of silicon power transistors 118 and 120. The collector of silicon power transistor 118 is connected to ground and its emitter is connected to power supply 100 through power resistor 121. The collector of silicon power transistor 120 is connected to ground while its emitter is connected to power supply 100 through resistor 122.

The operation of solid state heating circuit 46 is as follows: Zener diode 102 and resistor 104 establish a reference voltage, thereby reducing or eliminating any voltage variations to the circuit as a result of intermittent power drains on the power source. Thermistor 108 and resister 110 form a voltage divider. Thermistor 108 has a negative temperature coefficient so that as the temperature in the immediate vicinity of thermistor 108 increases, the resistance of thermistor 108 decreases. As the temperature in the vicinity of thermistor 108 decreases the resistance of thermistor 108 increases. As the temperature decreases beyond a predetermined value, the voltage applied to the base of transistor 112 decreases and turns on transistor 112 which controls the base voltage to transistor 116 which in turn drives the power transistors 118 and 120. Power transistors 118 and 120 provide current flow through power resistors 121 and 122. Transistors 112, 116, 118 and 120 each provide current gain which increases the current flowing through power resistors 121 and 122. Resistor 114 establishes the base voltage of transistor 116 upon the activation of transistor 112.

Power transistors 118 and 120 generate heat as do power resistors 121 and 122. The heat generated by the power transistors 118 and 120 in the preferred embodiment may be approximately a total of 140 watts, while the heat generated by the power resistors may be a total of 100 watts. The power transistors 118 and 120 are in contact with the metallic mounting ring 40, uncovered by any component sealing, while the power resistors are located within the mounting ring 40, similarly uncovered. The heat generated by the power transistors 118 and 120 and the power resistors 121 and 122 is conducted by mounting ring 40 and mounting platforms 52, and uniformly distributed throughout the chamber formed between the upper surface of base 13 and the lower surface of fuel filter 52.

As the heat generated by power transistors 118 and 120 and power resistors 121 and 122 is distributed throughout the chamber the fuel in the vicinity of the thermistor 108 raises the temperature of thermistor 108 and decreases its resistance. The base voltage of transistor 112 increases thereby turning on transistor 112 so that transistor 116 no longer drives power transistors 118 and 120. Resistor 110 may be variable for controlling the base voltage to be applied to transistor 112 in order to set the predetermined temperature at which transistor 112 will conduct. Thus, as the temperature in the vicinity of the thermistor 108 decreases power transistors 118 and 120 and power resistors 121 and 122 are supplied with power and generate heat, increasing the temperature of thermistor 108 causing the resistance of thermistor 108 to decrease which turns off the power to power transistors 118 and 120 and power resistors 121 and 122.

Power transistors 118 and 120 and power resistors 121 and 122 are directly exposed to the fuel within the chamber and are in contact with mounting ring 40. This increases their ability to transfer their heat to the mounting ring 40 and to the fuel itself. The thermistor, however, is encased within component sealant 47, isolated from the power components. This isolation avoids a direct transfer of the heat generated by the power transistors and power resistors to the thermistor. The temperature of the thermistor is principally determined by the temperature of the fuel in the vicinity of the ring.

Applicant has described one embodiment of his invention and it will be obvious that other embodiments may be devised which do not depart from the spirit of applicant's invention.

What I claim is:

1. A solid state fuel heater unit for use in heating a fuel flow comprising:
   (a) a heat conducting mounting member;
   (b) a power transistor mounted on said mounting member in heat conducting relation thereto;
   (c) a power resistor mounted on said mounting member in heat exchanging relation thereto and electrically connected in series with said power transistor,
   (d) an electrical control circuit, including a thermistor, for controlling the operation of said power transistor, said control circuit being mounted on said mounting member by means of a component sealant isolating said thermistor from direct transfer of heat thereto by said power resistor and said power transistor, and (e) means for mounting said mounting member in a fuel flow with said power transistor, power resistor and mounting member in heat exchange relation to the fuel flow and said thermistor in temperature sensing relation to the fuel flow.

2. A solid state fuel heater unit as claimed in claim 1 wherein said mounting member is a metallic ring having said power transistor mounted thereon and said power resistor mounted therewithin and wherein said means for mounting said mounting member in said fuel flow is adapted to mount said metallic ring with its axis generally parallel to the direction of fuel flow.

3. A solid state fuel heater unit as claimed in claim 2 including a second power transistor mounted on said metallic ring and a second power resistor mounted within said metallic ring, said second power transistor and second power resistor being electrically connected in series with each other and in parallel with said series connected first power transistor and said first power resistor for control by said electrical control circuit.

4. A solid state fuel heater unit as claimed in claim 3 wherein said first and second power transistor are mounted on the outer periphery of said metallic ring.

5. A solid state fuel heater unit as claimed in claim 4 wherein said electrical control circuit is mounted within said metallic ring by means of said component sealant.

* * * * *